H. N. NIEMANN.
COMPRESSED AIR GREASE GUN.
APPLICATION FILED JUNE 5, 1917.
1,312,642.
Patented Aug. 12, 1919.
2 SHEETS—SHEET 1.
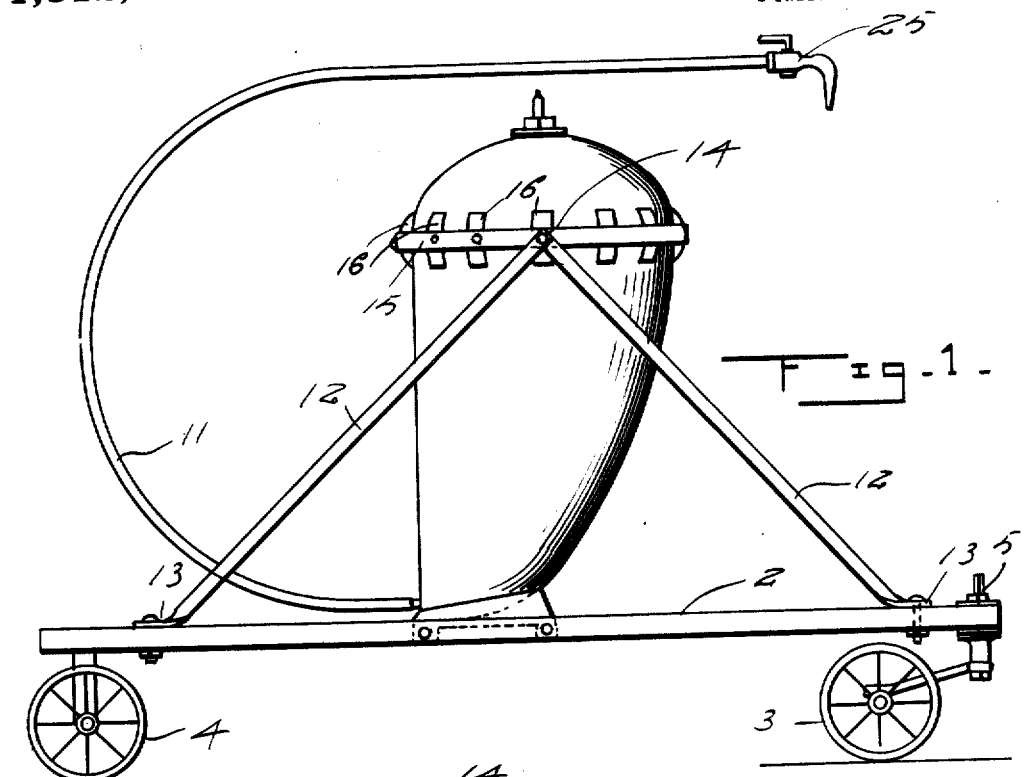
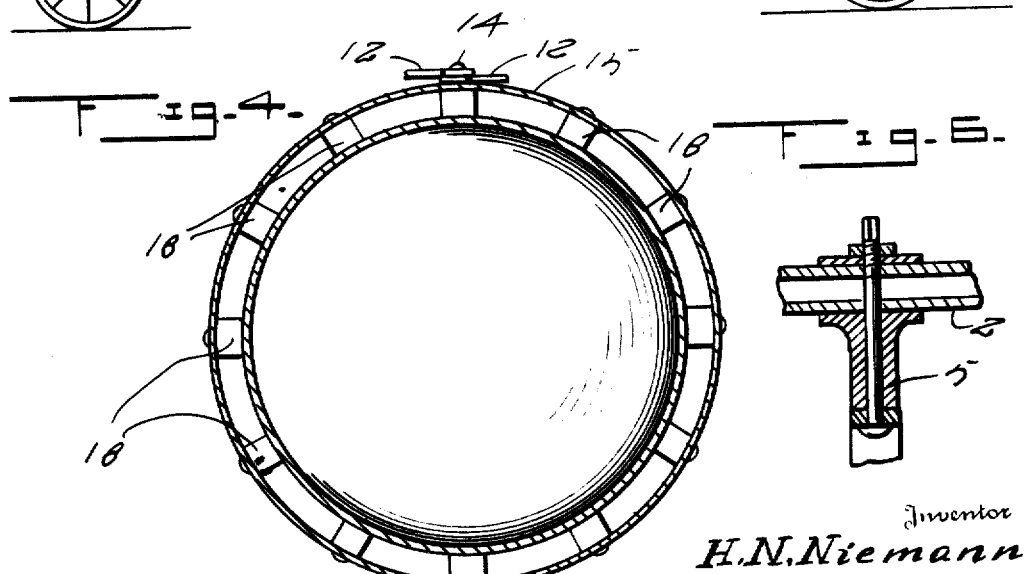
Witnesses
Inventor
H. N. Niemann

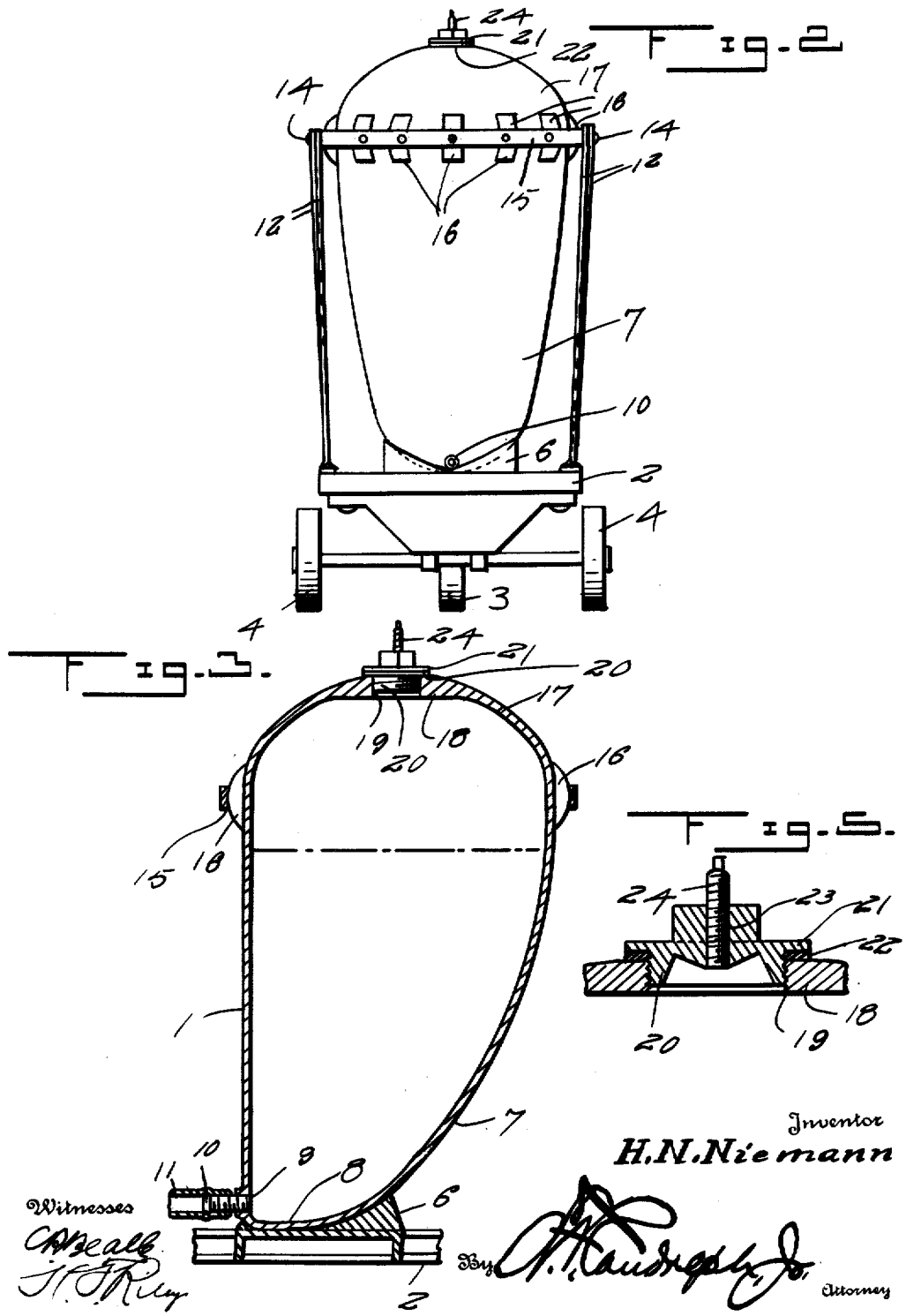

UNITED STATES PATENT OFFICE.

HARRY N. NIEMANN, OF ARMSTRONG, IOWA.

COMPRESSED-AIR GREASE-GUN.

1,312,642.  Specification of Letters Patent.  Patented Aug. 12, 1919.

Application filed June 5, 1917. Serial No. 172,921.

*To all whom it may concern:*

Be it known that I, HARRY N. NIEMANN, a citizen of the United States, residing at Armstrong, in the county of Emmet and State of Iowa, have invented certain new and useful Improvements in Compressed-Air Grease-Guns; and I do hereby declare the following to be a full, clear, and exact description of the invention, such as will enable others skilled in the art to which it appertains to make and use the same.

The invention relates to a compressed air grease gun.

The object of the present invention is to improve the construction of grease guns and to provide a simple, practical and efficient grease gun of strong, durable and comparatively inexpensive construction designed for use in garages for forcing grease in transmissions, differentials and universal joints and the like, and capable of being readily transferred from one point or place to another so that a large number of machines may be rapidly supplied with grease.

A further object of the invention is to provide a grease gun of this character having a relatively large capacity and adapted to utilize the air hose, ordinarily employed for inflating tires, for expelling the grease from the gun so that the grease gun, after being filled, may be easily operated without pumping the grease from the gun.

With these and other objects in view, the invention consists in the construction and novel combination of parts hereinafter fully described, illustrated in the accompanying drawings and pointed out in the claim hereto appended; it being understood that various changes in the form, proportion, size and minor details of construction, within the scope of the claim, may be resorted to without departing from the spirit or sacrificing any of the advantages of the invention.

In the drawings:

Figure 1 is a side elevation of a grease gun constructed in accordance with this invention.

Fig. 2 is an end elevation of the same.

Fig. 3 is an enlarged vertical sectional view through the tank of the grease gun.

Fig. 4 is a horizontal sectional view of the same.

Fig. 5 is a detail view illustrating the construction of the filling orifice and the closure plug or cap.

Fig. 6 is a detail view of the front portion of the truck.

Like numerals of reference designate corresponding parts in the several figures of the drawings.

In the accompanying drawings, in which is illustrated the preferred embodiment of the invention, the compressed air grease gun comprises in its construction a vertical tank 1 designed to be constructed of heavy sheet metal or other suitable material and mounted upon a truck consisting of a suitable supporting frame or platform 2 and front and rear supporting wheels 3 and 4, the front wheel 3 being in the form of a caster wheel and connected with the vertical pivot 5. Any desired form of truck may of course be employed and the tank is arranged upon a suitable seat 6 and is circular in cross section and provided with a curved inclined front wall 7 extending downwardly and rearwardly to and merging into the bottom wall 8 which is also curved and forms a continuation of the front wall 7. This forms a taper and is adapted to feed the grease to a rear discharge opening 9 from which extends a nipple 10 adapted to enable a discharge pipe 11 to be readily connected with the tank. The seat 6, which may consist of a block or piece, is curved transversely and longitudinally and presents a transversely concave longitudinally inclined surface to conform to the configuration of the bottom of the tank. The seat may be carried by a cross piece and the frame may consist of channeled metal as shown, but any other desired construction may of course be employed. The tank is supported in an upright position by side supports composed of oppositely inclined bars or braces 12 suitably secured at their lower ends 13 to the truck and connected at their upper ends at 14 to a horizontal band 15 surrounding the tank and carrying a plurality of clamping blocks 16 arranged at intervals in an annular series and fitted against the upper portion of the tank. The inner faces of the clamping blocks 16 conform to the configuration of the tank, and the top 17 of the tank is dome-shaped and thickened at the center at 18 and provided with a filling orifice 19. The filling orifice 19 is threaded for the reception of a threaded closure plug or cap 20 provided with a flange 21 which extends outwardly from the opening 19, a washer or gasket 22 of rubber or other suitable material being preferably interposed between the flange 21 and the top of the tank to form an air tight connection.

The closure plug or cap is provided with a central threaded aperture 23 into which is screwed an air valve 24 designed to be constructed substantially the same as the ordinary valve on an inner tube of a pneumatic tire so as to receive the air hose (not shown) of the ordinary construction which is usually employed for inflating pneumatic tires.

The discharge tube 11 is provided with a faucet or valve 25 which is closed until the pressure within the tank registers about fifty pounds. The faucet or valve may then be opened to discharge the grease, and it has been found in practice that about one pound of the grease will feed in about four seconds. The compressed air grease gun is designed for supplying hard or stiff grease to transmissions, differentials, universal joints and other gears and bearings of an automobile or other motor vehicle or device, and after the grease is supplied to the tank it may readily be discharged into gears and bearings and the like without pumping the grease from the tank. By this construction, the gears, bearings and the like of automobiles may be easily and rapidly supplied with grease.

What is claimed is:

A compressed air grease gun comprising a tank substantially circular in horizontal section and having one of its walls vertical, a discharge opening in the lower end of the wall and having its opposite wall curved downwardly and inwardly toward the vertical wall, to facilitate the flow of grease from the opening, a support, a seat carried by the support, said seat having its upper surface curved transversely and longitudinally, the longitudinal curvature being extended at an inclination to receive the lower end of the tank, and braces extending from the support to the upper end of the tank, to hold the same on its seat, a discharge pipe connected with the discharge opening and having a valve or cutoff, and means for filling the tank and for admitting fluid pressure to the same.

In testimony whereof I affix my signature in presence of two witnesses.

HARRY N. NIEMANN.

Witnesses:
E. F. KNOWLES,
J. M. THORSON.